Patented Feb. 3, 1953

2,627,502

UNITED STATES PATENT OFFICE 2,627,502

BOILER WATER TREATMENT

Paul G. Bird, Western Springs, Ill., assignor to National Aluminate Corporation, Chicago, Ill., a corporation of Delaware No Drawing. Application May 7, 1949, Serial No. 92,099

5 Claims. (Cl. 210—23)

This invention relates to a method of preventing or minimizing corrosion due to oxygen in steam generators and steam lines.

Dissolved gases, particularly oxygen, are recognized as one of the most common causes of corrosion in steam generating equipment. Corrosion due to oxygen can be effectively controlled by carefully reducing the oxygen content of the feedwater supplied to the steam generator. This is commonly done by one or a combination of the following processes: deaeration, deactivation, and chemical absorption.

In the latter process, a material such as sodium sulfite or a tannin is introduced into the feedwater and reacts chemically with the dissolved oxygen. Sodium sulfite removes the oxygen by combining with it to form sodium sulfate.

There are two principal disadvantages, however, in the use of sodium sulfite. In the first place, its use increases the dissolved solids in the boiler water, and it may suffer undesirable decompositions at high pressures and temperatures, resulting either in the appearance of sulfur dioxide in the steam being produced, or in reduction to the sulfide. Secondly, if it is added to the feedwater before the feedwater passes through the deaerator, a substantial excess must be employed because the sodium sulfite reacts with some of the oxygen before the water reaches the deaerator.

It is an object of this invention to provide an improved process for the chemical absorption of dissolved oxygen from boiler feedwater wherein no undesirable dissolved solids are added to the water.

It is a further object to provide a chemical treatment for boiler feedwater which may be added to the feedwater ahead of the deaerator and which will pass the deaerator in a substantially unreacted state capable of absorbing, at the temperatures subsequently encountered, the oxygen not removed by the deaerator.

Still a further object is to provide a material to be added to boiler feedwater for the chemical absorption of oxygen which will be converted, by oxidation, to a material which is of value in the boiler from the standpoint of scale prevention. Other objects will appear hereinafter.

I have now found that phosphites are valuable oxygen absorbents for use in boiler feedwater, and possess several important advantages over hitherto used materials. Phosphites are particularly effective in steam generators operating at pressures of 300 pounds per square inch (p. s. i.) and over, and the corresponding temperatures. They are relatively inert, in the absence of a catalyst, at temperatures commonly employed in feedwater deaerating equipment. Because of this inertness, the phosphites may be added to the feedwater before it is heated in the deaerator and after the feedwater has passed the deaerator it will be found to still contain substantially all the phosphite originally added. The phosphite is then available to absorb (or "scavenge"), in the economizer and in the boiler, the remaining oxygen which was not removed by the deaerator.

An additional important advantage in the use of phosphites, particularly in steam generators operating at pressures of 300 p. s. i. and over, preferably 300 to 3,000 p. s. i., is that the phosphites are converted to phosphates and the orthophosphate resulting from their use is valuable from the standpoint of scale prevention primarily due to its ability to precipitate calcium orthophosphate in the boiler. Phosphates are commonly used in high pressure boilers for this purpose.

Any of the ordinary soluble alkali metal orthophosphites, hypophosphites and hemiphosphites are suitable. Most common of these are the sodium salts, viz, sodium orthophosphite pentahydrate, $Na_2HPO_3.5H_2O$; sodium orthophosphite anhydrous, $Na_2HPO_3$; sodium acid orthophosphite, $NaH_2PO_3$; sodium hypophosphite, $NaH_2PO_2.H_2O$ and sodium hemiphosphite, $NaH_3(HPO_3)_2$. The corresponding potassium salts would be equally suitable.

The amount of any of these phosphites required for oxygen absorption, calculated in terms of $Na_2HPO_3$, is the same as the amount of sodium sulfite, with which the art is already familiar. In using sodium sulfite as an oxygen scavenger it is customary to add enough to the feedwater at a point after the deaerator so that a residual amount of about 10 to 50 parts per million (p. p. m.) by weight, will be maintained in the boiler water. Similar excesses of phosphite have been found to represent good operating practice. In general, the addition of 1 to 10 p. p. m. of anhydrous sodium phosphite to the feedwater, on a weight basis, or the chemically equivalent amount of one or more of the phosphite compounds previously mentioned, will provide the oxygen absorption desired and give the desired excess. Larger amounts are not, however, detrimental except that it is often undesirable to increase the dissolved solids in the boiler water more than necessary.

In the addition of phosphates to high pressure boilers, it is common practice to add them to the boiler drum as contrasted to addition to the feed lines. This mode of addition of the phosphites may also be used, and oxygen absorption in the boiler thereby obtained.

The preferred method of introducing the phosphites into the boiler water is to feed them along with other treating chemicals, such as carbonates, phosphates and organic substances, such as tannin, starch, lignins, lignin derivatives and the like.

The phosphites are preferably used in boiler waters where some degree of alkalinity is desired, that is to say, boiler waters operated at a pH over 7.0. In case high alkalinity is desired in the boiler water, the disodium phosphite salt is preferably used, while if lower alkalinities are desired the primary phosphite or phosphorous acid are preferably employed.

While the hereinabove described practices relate principally to steam generation at pressures of about 300 p. s. i. and above, and the corresponding temperatures, it should be pointed out that the phosphites can be used as oxygen absorbents at lower pressures and temperatures if a small amount of cobalt is used therewith as a catalyst. Quantities of cobalt (calculated as metal) of the order of 0.05 to 0.1 p. p. m. by weight of the feedwater are generally adequate.

Instead of cobalt catalysts other catalysts which increase the rate of reaction of phosphites with oxygen can be employed. In general, the optimum results have been obtained with the cobalt catalysts, preferably cobaltous sulfate. Other cobalt catalysts which may be used are cobaltous nitrate, cobaltous chloride, cobaltic sulfate, cobaltic nitrate and cobaltic chloride. As examples of other catalysts which promote this reaction may be mentioned the manganous and manganic sulfates, nitrates and chlorides and the corresponding ferric and ferrous, cupric and cuprous and nickel salts.

The expression alkali metal phosphite as employed herein is intended to include and cover the alkali metal orthophosphites, hypophosphites and hemiphosphites.

Where a catalyst is used to catalyze the reaction of oxygen with an alkali metal phosphite to form an alkali metal phosphate the quantity required is extremely small and will usually be a fraction of one part per million by weight calculated on the basis of the metallic component of the catalyst added to the feed water. In general, the quantity used is preferably within the range of 0.05 to 0.50 p. p. m. by weight of the feed water.

The invention is hereby claimed as follows:

1. A method of generating steam in steam boilers operating below about 300 pounds per square inch but above the boiling point of water, which comprises incorporating with the feedwater to the boiler where the steam is generated 1 to 10 parts per million by weight of an alkali metal phosphite and 0.05 to 0.5 part per million by weight, calculated as the metal, of a cobalt salt dissolved in said water.

2. An alkaline water for steam generation containing 10 to 50 parts per million by weight of an alkali metal phosphite, calculated as $Na_2HPO_3$, said water also containing a fraction of one part per million by weight of a dissolved cobalt salt, said quantity of cobalt salt being at least 0.05 part per million parts of said water and being sufficient to accelerate the reaction of oxygen with said phosphite to form phosphates when steam is generated by boiling said water at steam pressures below about 300 pounds per square inch.

3. A method of generating steam in steam boilers operating below about 300 pounds per square inch but above the boiling point of water which comprises adding to the feed water to the boiler where the steam is generated 1 to 10 parts per million parts of water by weight of an alkali metal phosphite and a quantity of a catalyst from the group consisting of manganese salts, copper salts, nickel salts and cobalt salts, said salts being soluble in said water and being effective to catalyze the reaction of oxygen with phosphites to form phosphates, and boiling said water under said steam generating conditions, the quantity of said salts being sufficient substantially to reduce said oxygen corrosion.

4. A method of generating steam in steam boilers operating under steam generating conditions where oxygen corrosion normally occurs which comprises incorporating with the feed water to the boiler where the steam is generated 1 to 10 parts per million by weight of an alkali metal phosphite and at least 0.05 part of cobalt sulfate, calculated as cobalt, per million parts of said water, and boiling said water, the quantity of said cobalt sulfate being sufficient substantially to reduce said oxygen corrosion.

5. An alkaline boiler water containing 10 to 50 parts per million by weight of an alkali metal phosphite, calculated as $Na_2HPO_3$, said water also containing a quantity of dissolved cobalt sulfate, said quantity being at least 0.05 part of cobalt sulfate, calculated as cobalt, per million parts of said water and not substantially more than about 0.5 part of cobalt sulfate per million parts by weight of said water.

PAUL G. BIRD.

REFERENCES CITED

The following references are of record in the file of this patent:

UNITED STATES PATENTS

| Number | Name | Date |
|---|---|---|
| 1,345,323 | Frazer et al. | June 29, 1920 |
| 1,841,825 | Kriegsheim | Jan. 19, 1932 |
| 2,046,308 | Rice | June 30, 1936 |

OTHER REFERENCES

Chemical Abstracts, vol. 22, page 4321, 1928; vol. 28, page 3678, 1934.

Inorganic and Theoretical Chemistry, by Mellor, vol. 8, 1928, page 905.